United States Patent

Traub et al.

[15] 3,654,488

[45] Apr. 4, 1972

[54] CIRCUIT ARRANGEMENT FOR LIMITING AMPLITUDE MODULATION IN A FREQUENCY MODULATED SIGNAL

[72] Inventors: Karl Traub, Furth; Gunther Benecke, Nurnberg, both of Germany

[73] Assignee: Grundig E.M.V. Elecktro-Mechanische Versuchsanstalt, Furth/Bayern, Germany

[22] Filed: Nov. 18, 1970

[21] Appl. No.: 90,615

[30] Foreign Application Priority Data

Nov. 22, 1969 Germany ......................P 19 58 749.6

[52] U.S. Cl. ..............................307/237, 325/347, 325/482, 329/131

[51] Int. Cl. ........................................H03k 5/08, H04b 1/10

[58] Field of Search ..................307/237; 325/320, 344, 347, 325/348, 482, 479; 329/131, 134; 330/29

[56] References Cited

UNITED STATES PATENTS

| | | | |
|---|---|---|---|
| 3,166,639 | 1/1965 | Babb | 307/237 X |
| 2,964,650 | 12/1960 | Radcliffe, Jr. et al. | 307/237 X |
| 3,193,771 | 7/1965 | Boatwright | 307/237 X |
| 3,205,442 | 9/1965 | Stamboulis | 325/347 X |

*Primary Examiner*—John Zazworsky
*Attorney*—Michael S. Striker

[57] ABSTRACT

A first transistor stage has a tuned output circuit. A coil coupled to the tuned output circuit has, in parallel with it, a series circuit of a resistance and a pair of diodes connected in parallel but with opposite polarity. Terminal of the resistance not connected to the pair of diodes may be connected to the top of the coupling coil via a resistance and is connected to the base of the subsequent transistor stage.

2 Claims, 2 Drawing Figures

INVENTOR
KARL TRAUB
BY GUNTHER BENECKE
By:
ATTORNEY

CIRCUIT ARRANGEMENT FOR LIMITING AMPLITUDE MODULATION IN A FREQUENCY MODULATED SIGNAL

BACKGROUND OF THE INVENTION

This invention relates to an arrangement for limiting amplitude modulation and for improving the dynamic selectivity in a radio frequency receiver receiving frequency modulated signals.

It relates in particular to such circuits using a pair of parallel diodes connected with opposite polarities.

The use of such diodes in low frequency amplifiers is known. For example, a circuit arrangement is known (U.S. application Ser. No. 720,577 filed Apr. 11, 1968 by the inventor Hans-Georg Rimkus) wherein the dynamic resistance of two such diodes, arranged in an AC circuit is controlled by a voltage proportional to the input voltage in such a manner that the amplifier has a substantially constant output voltage.

A pair of diodes connected as described above, namely in parallel but with opposite polarity, are used in an arrangement disclosed in German Auslegeschrift Pat. No. 1,178,118 in such a manner that the output voltage of a modulation amplifier is controlled for greatly varying input voltages. However, in this case a feedback arrangement controlling the impedance of the diodes by means of the rectified output signal is used.

FIG. 2 of German Auslegeschrift Pat. No. 1,246,037, shows a capacitance diode connected in parallel to the tuned collector circuit of a transistor. It is the function of this diode to compensate for changes in collector circuit capacitance by opposite changes in the barrier layer capacitance. This diode does not serve to limit the signal, since it is always connected in reverse or blocking condition.

SUMMARY OF THE INVENTION

It is the object of this invention to furnish an arrangement for suppressing amplitude modulation in a frequency modulated signal for both polarities, and without adversely affecting the transmission characteristics of the amplifier.

This invention comprises a first transistor stage having a tuned output circuit furnishing a first output signal. It further comprises a second transistor stage having an input. Coupling means, preferably a coupling coil, couple said first output signal to said input of said second transistor stage. Connected in parallel with said coupling coil is a series circuit comprising a resistance connected in series with a pair of diodes. The pair of diodes is connected in parallel, but with opposite polarity. The series circuit is connected in parallel with the coil in such a manner that the terminal of the resistance not connected to the two diodes is connected directly to the base, namely the input, of said second transistor stage and, either directly or via a second resistance to the top of the coupling coil. The diodes both have a low forward resistance and a low barrier layer capacitance.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENT

Figure 1:
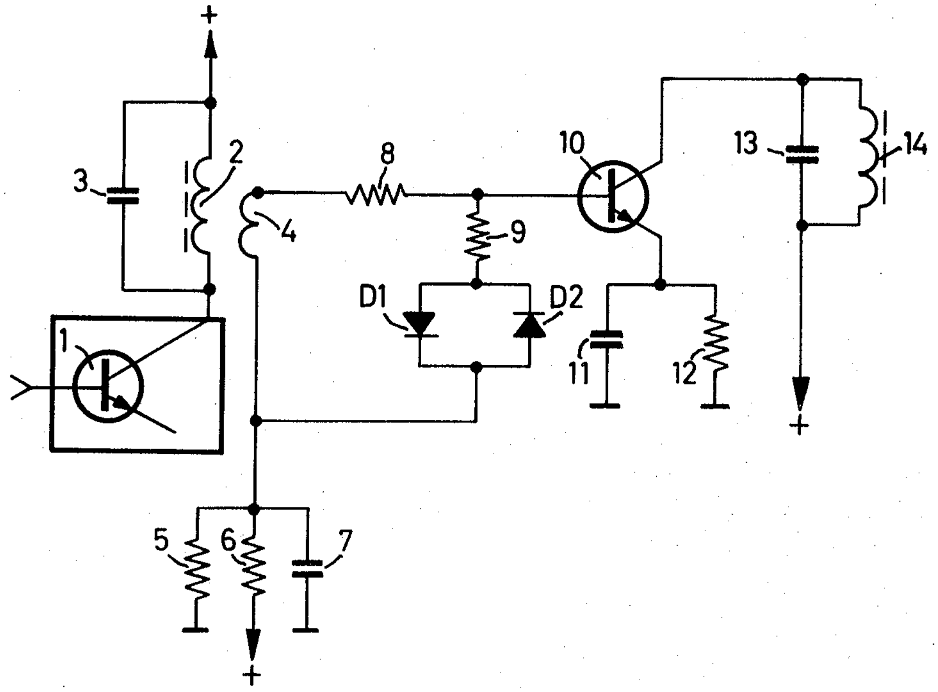
FIG. 1 shows a circuit diagram of an arrangement in accordance with the present invention.

The preferred embodiment of the present invention will now be described with reference to the drawing.

FIG. 1 shows a simplified circuit diagram of the present invention. A first transistor stage including the transistor labeled 1 in FIG. 1 and not shown in full in the drawing since it is a standard transistor stage in the RF section of the receiver, has a tuned circuit comprising the parallel combination of an inductance 2 and a capacitance 3 connected to the collector of transistor 1. The circuit may be tuned to a frequency of 10.7 MHz. The bias voltage for the base of a second transistor, labeled 10 in FIG. 1, is provided by a voltage divider having a resistance 5 connected to a resistance 6 from ground to the positive supply terminal and a capacitor 7 connected from the common point of resistors 5 and 6 to ground. The common point of resistors 5 and 6 is also connected to the lower end of a coupling coil 4 which serves as coupling means to couple the signal from the first transistor stage including transistor 1 to the second transistor stage which includes transistor 10. The upper end of coil 4 is connected via a resistance 8 to the base of transistor 10. The base of transistor 10 is also connected to a series circuit comprising resistance 9 and the parallel combination of diodes D1 and D2. It will be noted that the polarity of diode D1 is opposite to that of D2. The series circuit has a second terminal which is also connected to the common point of resistors 5 and 6, thus placing the series circuit in parallel with coil 4 if resistance 8 is omitted, as it may be in some instances. The emitter of transistor 10 is connected to ground via the parallel combination of a resistance 12 and a capacitor 11, while its collector is connected to a tuned circuit such as that shown for the first transistor stage.

Figure 2:
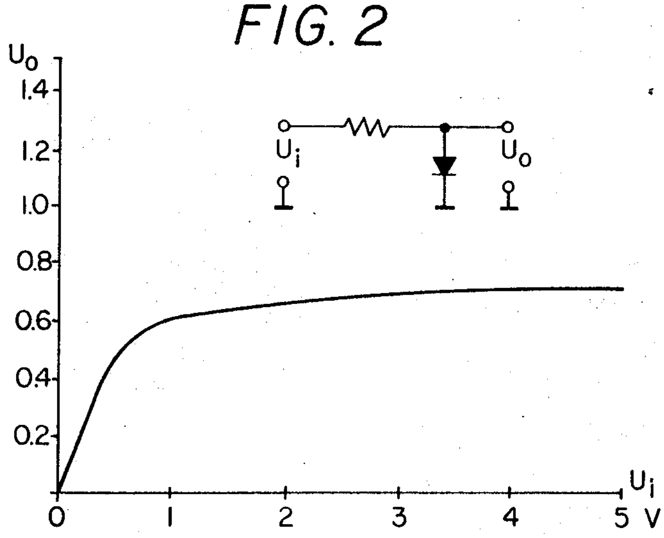
FIG. 2 shows a circuit for demonstrating the amplitude limiting of the diodes used in FIG. 1 and the output-input characteristics of said circuit.

The above described arrangement operates as follows: Reference to FIG. 2 shows how the characteristics of the diodes used herein (for example, Valvo diodes BA182) are used to effect limiter action. FIG. 2 shows a voltage $U_i$ which is applied to the series combination of a resistance and the diode in question, while a voltage $U_O$ is derived across the diode. The voltage out $U_O$ versus the voltage in, $U_i$, is also plotted in FIG. 2. It will be seen that for voltages below circa 0.5 volt the diode characteristic is substantially linear, and that the limiting action then commences and for a range of voltages at the input of up to 5 volts the output voltage remains substantially constant. It will now be seen that, in FIG. 1, both the negative and the positive halfwaves will be limited by the diodes if the voltage across the diodes exceeds circa 0.5 volt.

This limiting action has a number of other advantages. For example, not only is the actual change in dynamic capacitance of the diodes very small, but its effect is felt only proportional to the square of the turns ratio between coils 2 and 4 inasfar as detuning effects on transistor stage 1 are concerned. Furthermore, when resistor 8 is present, the capacitance change of the diodes, as well as the input capacity of the second transistor stage, namely the stage including transistor 10, is reflected back into the first transistor output via the resistor 8 thus causing its effect on the detuning of said first transistor stage to be negligible. Thus an amplitude modulated RF signal cannot be phase-modulated by the arrangement of the present invention. If the diodes were connected into the collector circuit, a relatively large series resistor would have to be used thus weakening the limiting action. In the present connection, the resistance value of resistor 9 can be determined solely on the basis of an optimum limiting action or an exact balancing of the possible amplitude modulation in either the increasing or decreasing direction.

The arrangement in accordance with this invention not only effects an improvement by suppressing amplitude modulation and therefore decreasing interference, but also increases the dynamic selectivity. This is because, under certain conditions of reception, a decrease in dynamic selectivity results from a modulation of interference signal by the inherent noise of the receiver. This can lead to a great deal of interference in particular if the antenna voltages are low and the difference in frequency between the interference signal and the received signal is small. This situation can, in effect, result in a decrease of selectivity. This effect is greatly decreased by the type of broad band limiting, independent of frequency, which the circuit of the present invention discloses.

While the transistor circuits illustrated here use npn type transistors, the present invention is of course not limited to this type.

What is claimed as new and desired to be protected by Letters Patent is set forth in the appended claims:

1. An arrangement for limiting amplitude modulation in a frequency modulated signal, comprising, in combination, a first transistor stage having a tuned output circuit furnishing a radio frequency signal; a second transistor stage having an input; coupling coil means inductively coupling said radio frequency signal to said input of said second transistor stage; and a series circuit connected in parallel with said coupling coil means, said series circuit comprising a resistance, and a pair of diodes connected in parallel but with opposite polarity, said diodes having a low forward resistance and a low barrier layer capacitance.

2. An arrangement as set forth in claim 1 further comprising a second resistance interposed between said coupling coil and said series circuit, said resistance and said second resistance having a common point connected to the input of said second transistor stage.

* * * * *